United States Patent [19]

Murphree

[11] Patent Number: 4,949,314

[45] Date of Patent: Aug. 14, 1990

[54] METHOD AND MEANS FOR INCREASING ECHO-RANGING-SEARCH RATE

[75] Inventor: Francis J. Murphree, Sunnyside, Fla.

[73] Assignee: The United States of America as represented by the Secretary of the Navy, Washington, D.C.

[21] Appl. No.: 573,168

[22] Filed: Aug. 16, 1966

[51] Int. Cl.$^5$ ............................................. G01S 15/00
[52] U.S. Cl. ...................................... 367/88; 367/106
[58] Field of Search ...................... 340/1, 3, 3 R, 3 T; 343/5 PR, 13; 367/88, 106; 342/25

[56] References Cited

U.S. PATENT DOCUMENTS

| | | | |
|---|---|---|---|
| 2,480,561 | 8/1949 | Ewing et al. | 367/106 |
| 3,297,980 | 1/1967 | Haslett | 367/106 |

Primary Examiner—Thomas H. Tarcza
Assistant Examiner—Daniel T. Pihulic
Attorney, Agent, or Firm—Sol Sheinbein; John Becker; Harvey David

[57] ABSTRACT

A sonar system having a transmitting transducer adapted for being moved along a predetermined path, a transmitter for energizing said transmitting transducer, an omni-directional receiving transducer spatially disposed behind said transmitting transducer, a sidewardly and downwardly looking receiving transducer contiguously disposed with said omni-directional receiving transducer, a receiver connected to the output of said sidewardly and downwardly looking transducer, a series connected detector, differentiator, delay, and time base generator coupled to the output of said omni-directional transducer, and a readout connected to the outputs of the aforesaid receiver and time base generator.

11 Claims, 1 Drawing Sheet

METHOD AND MEANS FOR INCREASING ECHO-RANGING-SEARCH RATE

The invention described herein may be manufactured and used by or for the Government of the United States of America for governmental purposes without the payment of any royalties thereon or therefor.

The present invention relates generally to echo-search-ranging systems, and, in particular, it is an underwater echo-search-ranging system of the pulsed shadowgraph type, which facilitates increasing target search rate to a considerable over that ordinarily obtained from the prior art. In even greater particualarity, it is an improved method and means for increasing the area search rate capability of a side-looking type of sonar system.

In the past, conventional side-looking sonars ordinarily incorporate transmitting and receiving transducers which are contiguously disposed or which are disposed in such manner as to provide easy access thereto with respect to the ramainder of the system. While for many practical purposes such prior art systems have been satisfactory, they usually leave a great deal to be desired from the standpoints of readout fidelity, target detection and identification ability, and the area that can be searched in any given period of time.

The present ivention overcomes most of the disadvantages of the prior art, in that it provides an improved method and means for increasing the number of search scans available for any given area to be searched, as a result of being able to operate at a more rapid scanning rate.

It is, therefore, an object of this invention to provide an improved echo-search-ranging method and means for finding and identifying a target.

Another object of this invention is to provide an improved side-looking, shadowgraph type of sonar system.

Still another object of this invention is to provide a method and means for increasing the area searched by a shadowgraph type of sonar systme in a given period of time.

A further object of this ivention is to provide a method and means for increasing the search rate of sonar and radar echo-search-ranging systems, regardless of the envorinmental mediums in which they are operating, respectively.

Another object of this invention is to provide an improved method and means for locating and identifying submarine mines and other undewater objects disposed above, lying on, or submerged in the sea floor.

Still another object of this invention is to provide an improved method and means for alerting a human or other operator that a target has been acquired.

Another object of this invention is to provide an improved sonar system which is easily and economically manufactured, operated and maintained.

Other objects and many of the attendant advantages will be readily appreciated as the subject invention becomes better understood by reference to the following detailed description when considered in conjuction with the accompanying drawing wherein.

Figure 1:
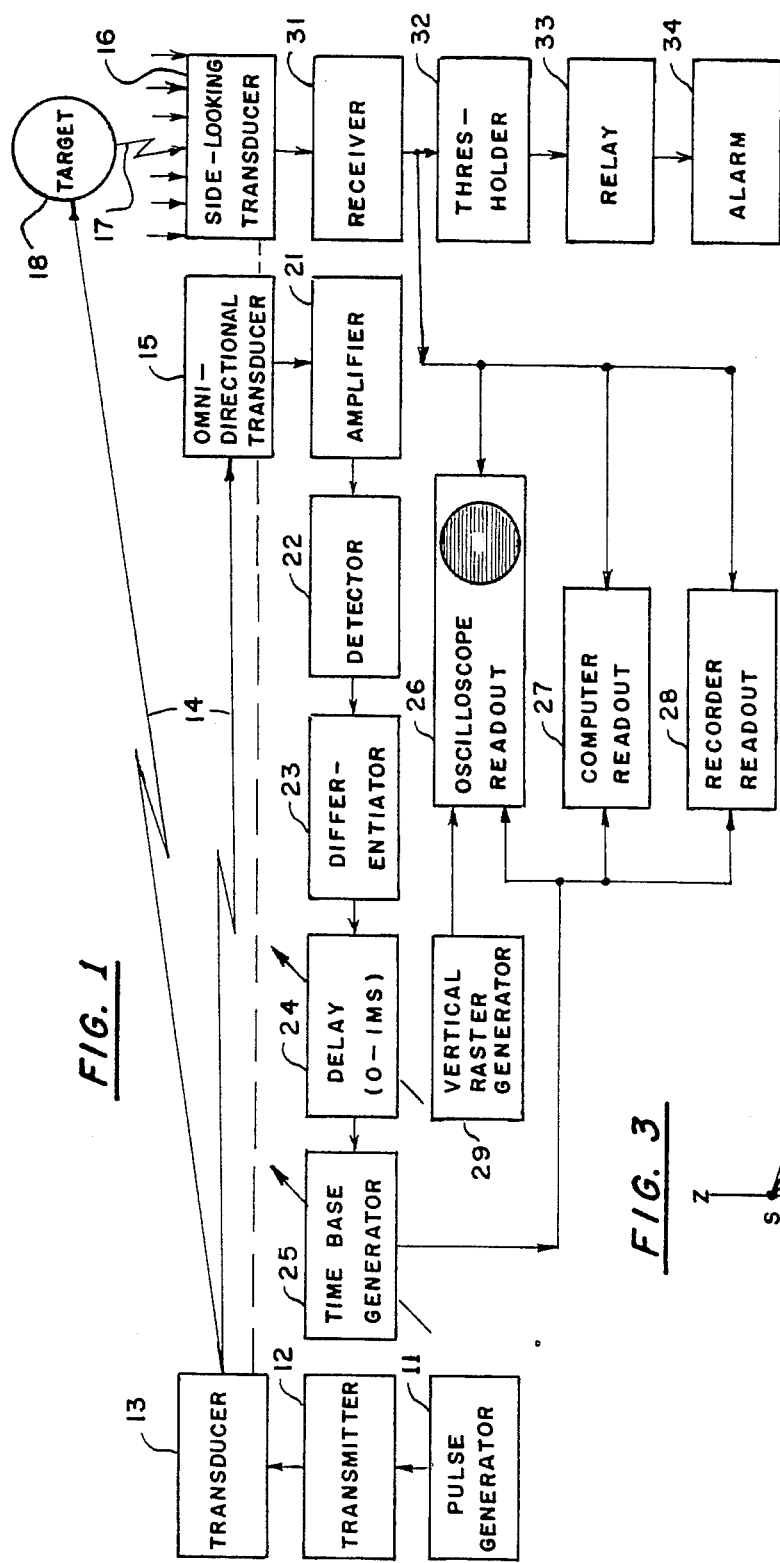
FIG. 1 is a block diagram of the subject invention.

Referring now to FIG. 1, there is shown in block diagram form an embodiment of the subject invention which may be used in any environmental medium desired for purposes indicated in the aforementioned objects. However, in order to keep this disclosure as simple as possible, the preferred embodiment of the subject invention that is herewith discussed will be considered as being a sonar system, with the environmental medium being water, sea water, or the like.

Inspection of the preferred embodiment of FIG. 1 will, therefore, disclose the incorporation therein of a pulse generator 11, having the output thereof connected to the input of a transmitter 12, which, in turn, has its output connected to an electroacoustical transmiting transducer 13.

As will be discussed more fully below in conjunction with the discussion of the operation of this invention, transmitting transducer 13 is adapted for broadcasting acoustical energy 14 in response to the electrical input signal from transmitter 12. Acoustical energy 14 is broadcast to some extent in all directions, but it is broadcast to an even greater extent in those directions which are most likely to include various and sundry subaqueous targets, and especially toward a pair of remotely disposed transducers, one of which is an omni-directional receiving transducer 15 and another of which is a sidewardly and downwardly receiving transducer 16. Since receiving transducer 15 is of the omnidirectional type, it will obviously receive that acoustical energy which travels along the most direct path between it and transmitting transducer 13, as well as that which is reflected from the sea floor and the like. On the other hand, inasmuch as receiving transducer 16 is a side-looking-down-looking transducer, it is disposed in such manner as will cause it to be responsive in a sidewardly and downwardly looking planar volume, the plane of which is perpendicular to the direction of travel thereof, as it is being towed through the water. Hence, it will, effectively, only receive an echo 17 from target 18 when target 18 is sidewardly and/or downwardly located with respect thereto.

Because it is operationally necessary to maintain substantially known fixed distances between all of the aforesaid transducers, dashed lines are used herein to represent positive mechanical connections therebetween.

Omnidirectioanl receiving transducer 15 has its output connected through an amplifier 21 to the input of a detector 22, and the output of detector 22 is, in turn, connection thorugh a differentiator 23 to the input of a delay device 24.

Delay device 24 may be any suitable device that will effect, for example, a zero-to-one-millisecond delay of the electrical signal passing therethrough. It may, for example, be a conventional monostable multivibrator having unstable state characteristics designed to be equal in time to the delay time desired or required by any given operational or environmental circumstances. Also, with respect to delay device 24, since it is herewith defined as preferably being a zero-to-one-millisecond delay device, it should be understood that the incorporation thereof is actually optional in the system constituting this invention, inasmuch as zero delay actually amounts to no delay device being present therein at all.

The output of delay device 24 is supplied to the input of an adjustable time base generator 25, which may produce one or more timing signals that causes the various and sundry readouts, namely, oscilloscope readout 26, computer readout 27, and recorder readout 28, to be properly synchronized as well as timely function at their own individual "sweep" rate. Hence, for example, one of the output signals which may be produced by time base generator 25 is a sawtooth sweep signal which is applied to the horizontal sweep terminal of oscilloscope readout 26. In order to supply a vertical control signal for the scope of oscilloscope readout 26, a vertical raster generator 29 has its output connected to the vertical input thereof. Although oscilloscope 26 and raster generator 29 are herewith disclosed as being separated units, they may be combined, if so desired, as a single readout means unit, without violating the spirit and scope of this invention.

Of course, it should be understood that those signals appropriate for instigating the similar operations in computer readout 27 and recorder readout 28 are, likewise, to be produced and supplied thereto by time base generator 25.

At this particular time, it may be well to note that the actual readout of computer readout 27 may be either in analog or digital terms, in order to provide optimum observation and understanding thereof by a human or other operation. Furthermore, although not shown, it should be understood that the output of computer readout 27, especially if it is an analog type of signal, may be used to appropriately actuate any other utilization apparatus which is determined to be associated with the subject invention to an advantage.

Recorder readout 28, likewise, may be any appropriate recorder that will record and indicate intelligent signals supplied thereto in such manner that they may be interpreted and understood by human and/or other operators. For this purpose, however, it has been discerned that the conventional helical recorder performs this function in an eminently satisfactory manner.

In addition, readouts 26 through 28 should merely be considered as exemplary, and that others, as appropriate, including other utilization apparatus, may be substituted therefor, if so desired, inasmuch as so doing would be obvious to one skilled in the art having the benefit of the teachings herewith presented.

The output from the aforesaid side-looking-downlooking receiving transducer 16 is supplied to the input of a receiver 31, which converts it to a more useful signal proportional thereto (such as by heterodyning, detection, and amplification, or the like, as necessary), and the output thereof is then supplied to the intensity or intelligence or data inputs of the aforementioned oscilloscope readout 26, computer readout 27, and recorder readout 28, respectively.

The output of receiver 31 is also applied to the input of a theresholder 32, which is preferably so designed as to produce an output signal when and only when the mangitude of the signal input thereto is less than a predetermined design amount. The output of thresholder 32 is supplied to the input of a relay 33, with the output thereof connected to the input of an alarm 34.

At this time, it should perhaps be mentioned that each of the elements represented in block form in FIG. 1 is well known and conventional per se; therefore, it is to be understood that it is their unique relative dispositions, their unique interconnections, and their unique interactions, respectively, that caused tha subject invention to exist and produce the stated new and improved results.

The operation of the subject invention will now be discussed briefly in conjunction with all of the figures of the drawing.

Figure 4:
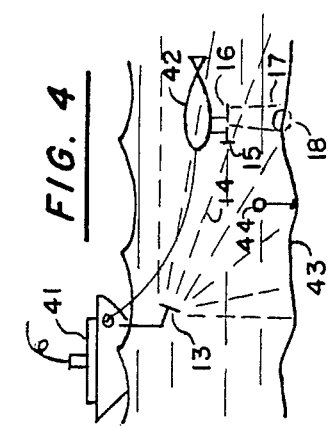
FIG. 4 is a quasi-pictorial view of an object hunting system which may incorporate the subject invention to an advantage.

As shown in FIg. 4, a ship 41 (or other marine, submarine, air, or spacecraft vehicle) tows a submarine vehicle 42 along a predetermined navigation course, at such speed, and in such manner that the distance therebetween is known and substantially constant. As ship 41 travels along, transmitting transducer 13 attached thereto broadcasts acoustical energy with a radiation pattern which insonifies the water and the sea floor-water interface over a given angle with the horizontal plane and in the general direction of towed submarine vehicle 42. Receiving transducer 15 located thereon receives that portion of the broadcast acoustical signal which travels in a direct, substantially straight line path thereto from transmitting transducer 13. Upon receipt of said acoustical signal by transducer 15, it is converted to an electrical signal proportional thereto. This electrical signal is then amplified by amplifier 21 to a more useful level before being detected by detector 22. Detector 22 polarizes it to make it contain an unchanging polarity, although the voltage level thereof may vary from time to time. This detected signal is then differentiated to timely form trigger signals which, after traveling through variable delay device 24, ultimately triggers time base generator 25.

As previously suggested, the incorporation of delay device 24 is optional, and, hence, it may be adjusted to effectively delete it merely by manually or otherwise adjusting it to the zero delay condition. On the other hand, it may also be adjusted to contain such delay as is necessary to compensate for the difference in physical locations of transducers 15 and 16; and, in addition, if so desired, it may be adjusted to move the zero setting or position of readouts 26, 27, and 28, as warranted by any given operational circumstances.

Time base generator 25 is preferably variable and is preferably a sawtooth generator of such character and design as to timely and properly effect the horizontal sweep of readout 26 in response to the aforesaid trigger signals. It may also include such other conventional circuits as would make one or the other of the outputs thereof compatable for similar purposes with the respective inputs of computer readout 27, recorder 28, and/or any other readout or utilization apparatus that may be added thereto or substituted therefor to an advantage.

Vertical raster generator 29 is, of course, connected to the vertical input of oscilloscope readout 26 to effect a two-dimensional image on the scope therof. Obviously, though, any other suitable vertical sweep generator type device may be substituted therefor, if so desired.

At some time subsequent to the triggering of the readouts by time base generator 25 as a result of acoustical signal reception by transducer 15, the sonic energy originally broadcast by transducer 13 is also received by side-looking transducer 16. Of course, since transducer 16, for most practical purposes, only receives that sonic energy which is arriving thereat from a sidewardly and downwardly planar volume or direction, the sonic energy, if any, actually received thereby is that which is first reflected from a target such as target 18.

In this discussion, target 18 is shown as lying on or partially submerged in the sea floor 43; however, it could just as readily be a target 44 that is suspended at some intermediate water depth, inasmuch as such are the usual dispositions of submarine mines and the like. And for the purpose of keeping this disclosure as simple as possible, target 18 is shown as being an echo reflecting target that is lying in a plane which passes through receiving transducer 16, which is substantially normal to the receiving face thereof, and which is also subtantially normal to travel direction therof.

Due to its having a sidewardly and downwardly, substantially thin planar, fan-shaped, response pattern, transducer 16 ordinarily only receives echoes from targets when they are located to the side thereof. Of course, other comparable relative positions of target and receiving transducer 16 are possible and operational, so the subject inventive concept should not be limited to the preferred arrangement discussed herewith. However, if an optimum shadowgraph type of operation is desired, the preferred embodiment arrangement appears to be best.

Target echoes received by transducer 16 are converted thereby to proportional electrical signals which are then supplied to receiver 31 for further processing as necessary to make them compatable with the intelligence data inputs of readouts 26, 27, and 28. Again, if necessary, any conventional signal processors or shapers may be inserted between the output of receiver 31 and each of said readouts to put the type of input signals supplied thereto into acceptable form, respectively, in event different forms are required thereby. Of course, such items may, as suggested previously, be incorporated in receiver 31, too.

Because transducer 16 is located a known distance behind transducer 13 and has its receiving pattern sidewardly and downwardly looking, the picture displayed on the face of the scope of oscilloscope 26 will include a target data image and a shadow directly behing it for the same reasons such images occur in any shadowgraph type of sonar system. However, because the distance traveled by target echo 17 is smaller to transducer 16 in its instantly disclosed position than it would be if transducer 16 were located at or contiguously with transmitting transducer 13 (as is the case in most shadowgraph types of sonars), the search rate may be increased. The critical distances which make this invention produce the improved results stated previously, are (1) the distance between the transmitting transducer and the target, (2) the distance between the transmitting transducer and the zero indicating transducer, and (3) the distance between the target and the echo receiving transducer. Hence, it may readily be seen that the search rate of this invention is determined by the geometrical configuration resulting from the the combined positions of transducers 13, 15, and 16, and target 18, and the fact that transducer 16 is essentially a sidewardly and downwardly looking transducer which receives an angular or side view of the target and its shadow.

Figure 2:
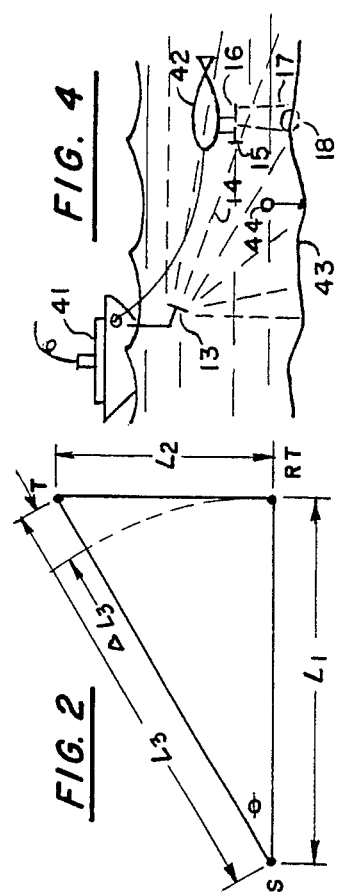
FIG. 2 is a diagrammatical representation which facilitates understanding the theory of two-dimensioanal operation of the subject invention.

In theory, this can be proven logically. Referring now to FIG. 2, wherein there is shown a special case, namely a hypothetical configuration occurring in a horizontal plane, let S represent the position of the sound source, T represent the position of the target, and RT represent the position of both receiving transducers. Then:

$L_1$ = distance between sound source S and receiving transducer RT;

$L_2$ = distance between target T and receiving transducers RT;

$L_3$ = distance between sound source S and target T;

$\Delta L_3$ = the difference between $L_3$ and $L_1$; and $\theta$ = the angle in degrees between $L_3$ and $L_1$.

If the distance $L_1$ is large compared to $L_2$, the period of the pulse generator will be shorter than the time required for sound to travel distance $L_2$; hence, there will always be several bursts of acoustical energy in transist between S and RT. Thus, the aqueous medium (or other as the case may be) is used effectively to store energy.

In a regular sonar, the maximum number of echoes ($E_m$) that i is possible to receive from a target is $$E_m = \frac{C}{2L_2}, \qquad (1)$$

because the time required for one round trip ($t_r$) is $$t_r = \frac{2L_2}{C} \text{ seconds.} \qquad (2)$$

Hence, if the ping rate of prior art sonars is greater than $C/2L_2$, targets from two or more distinct ranges will be received at the same time, thereby causing ambiguities to occur. But, in the present invention, although the ping rate is greater than $C/2L_2$, no ambiguities occurs, because of the separation of sound source and receiving transducers. Even if the transmission takes place before reception is complete, no echoes due to this transmission are received until at least $L_1/C$ seconds later, which is the beginning of the new range measurement cycle.

Referring again to FIG. 2, this may be shown to be true mathematically. Letting $$t_1 = \frac{L_1}{C}, \qquad (3)$$

$$t_2 = \frac{L_2}{C}, \qquad (4)$$

$$t_3 = \frac{L_3}{C}, \qquad (5)$$

where $t_1$, $t_2$, and $t_3$ are travel times for the distances $L_1$, $L_2$, and $L_3$, respectively. The difference $\Delta t$ in the time of arrival of the direct transmission and an echo from an object at T at RT is:

$$\Delta t = t_2 + t_3 - t_1 \qquad (6)$$

and $$\Delta t = \left( \frac{L_2 + L_3 - L_1}{C} \right). \qquad (7)$$

But, $$\sin\theta = \frac{L_2}{L_3}, \text{ and} \qquad (8)$$

$$L_3 = \frac{L_2}{\sin\theta}, \text{ and} \qquad (9)$$

$$\tan = \frac{L_2}{L_1}, \text{ and} \qquad (10)$$

$$L_1 = \frac{L_2}{\tan\theta}. \qquad (11)$$

Substituting equations 9 and 11 in 7, $$\Delta t = \frac{L_2}{C}\left[\left(1 + \frac{1}{\sin\theta}\right) - \frac{1}{\tan\theta}\right] \qquad (12)$$

When $\theta$ approaches 90°, this expression approaches $2L_2/C$; when $\theta$ approaches 0, it approaches $L_2/C$, since $\sin\theta \simeq \tan\theta$ when $\theta$ is small.

When $\theta = 45°$, for example, $$\Delta t = \frac{L_2}{C}(1 + 1.4 - 1) = \frac{1.4 L_2}{C}, \qquad (13)$$

and, in this case, the maximum allowable ping rate $1/\Delta t$ is $C/1.4\,L_2$ compared to $C/2L_2$, if $\theta = 90°$.

The ratio of these two expressions is $$\frac{C}{1.4 L_2} \div \frac{C}{2L_2} = 1.4; \qquad (14)$$

hence, the allowable ping rate for a target a distance $L_2$ from the receiving transducers is approximately 40% greater when the geometrical configuration of FIG. 2 is employed with $\theta = 45°$ than it would be in the conventional prior art arrangement where the transmitting and receiving transducers are located at the same place. When $\theta$ approaches 0, the allowable ping rate approaches twice that of the conventional prior art arrangement.

Since, in general, a fixed number of "looks" per target is necessary for detection and/or classification thereof, other factors remaining the same, and increase in the allowable ping rate will make it possible to detect targets at longer ranges, or to physically move the subject sonar at a greater speed along the course being searched.

The previously stated results are true when the transducers all lie on a line parallel to the direction of travel and all targets lie in a plane containing said transducers. Obviously, this is a special case which probably will not occur in reality too often. However, it does facilitate discussing the theory of operation of the subject invention. But, in an actual operational situation, the targets usually lie above or below the transmitting and receiving transducers. A typical situation is diagrammatically illustrated in FIG. 3, which is essentially a three-dimensional extrapolation of the diagram of FIG. 2 and, therefore, somewhat more general in theory disclosure.

The maximum ping rate, in general, will depend on whether the reference time from which the ping rate is established is assumed to be when the transmitted ping arrives at the omni-directional receiving transducer 15 via a direct path $r_d$ or via an indirect path $r_1 + h_1$. If all targets are assumed to be lying on the sea floor, it is advantageous to use latter, but in event some of the targets are situated above the sea floor near the receiving transducers, the former would be preferable.

Figure 3:
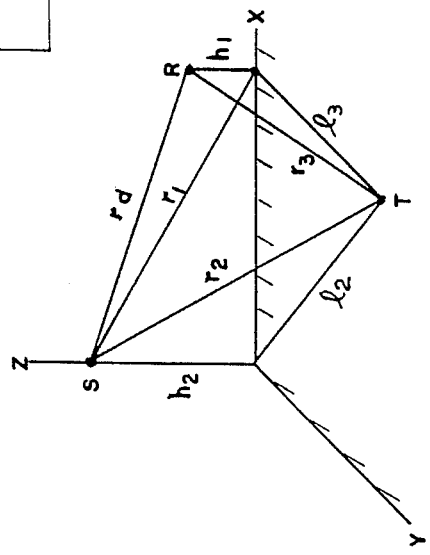
FIG. 3 is a diagrammatical representation of a more generalized extrapolation of the theory represented by FIG. 2, wherein three-dimensional considerations are illustrated.

This may be shown mathematically from the following, used in conjunction with FIG. 3:

Letting $\Delta t$ again be the difference between the zero reference time of receipt of the last echo from some maximum range; and letting the ping rate be $1/\Delta t$, it may be seen that a pulse train transmitted at some arbitrary time arrives at receiving transducer R (or in the immediate vicinity thereof) after $r_d/C$ seconds via path $r_d$, and after $r_d + h_1/C$ seconds via path $(r_1 + h_1)$. Sound via path $(r_2 + r_3)$ arrives after $r_2 + r_3/C$ seconds.

In the first case $$\Delta t_1 = \frac{r_2 + r_3 - r_d}{C} \qquad (15)$$

seconds, and in the second case, $$\Delta t_2 = \frac{(r_2 + r_3) - (r_1 + h_1)}{C} \qquad (16)$$

seconds. Since $r_d \leq r_1 + h_1$, for all values of $h_1$, $\Delta t_2 \leq \Delta t_1$ and, thus, $1/\Delta t_2 \geq 1/\Delta t_1$. Hence, the permissable ping rate is greater if $h_1$ is small compared to $r_1$, the difference between $1/\Delta t_2$ and $1/\Delta t_2$ will be small, and either the direct or longer reference path may be used as the readout initiating parameter. In either case, however, it may be seen that using either one of said paths allows the ping rate to be increased and, consequently, the search rate is increased.

On occasion, during long periods of search for various and sundry submarine targets, the operation of this invention by a human operator may become sufficiently monotonous that his attention thereto may not be as intense as would ordinarily be desired. Hence, it is entirely possible that such operator may inadvertently miss the display of target images as they are received, unless his attention is directed thereto at the proper time by the ivention itself. For this reason, a simple alarm system has been incorporated therein which will warn an operator that a target echo signal is about to be received and, therefore, that he should direct his attention intensely to the readout means.

Because the target echo receiving transducer 16, due to its position with respect to transmitting transducer 13 and its direction of travel, will effectively receive target shadows prior to receiving the target images themselves, thresholder 32, connected to the output of receiver 31, is preferably designed in such manner that signals will pass therethrough only when they do not exceed a predetermined energy level, which, of course, represents said target shadow. In such instances, then, thresholder 32 will produce an output signal which energizes relay 33 to ultimately effect the sounding of alarm 34. Of course, using the aforementioned target shadow as the parameter which actuates the alarm system being herewith discussed is merely a matter of design choice. Obviously, it could be made to respond to those levels of signals obtained from receiver 31 which represent target echoes themselves. Although the former arrangement appears to be more optimum than the latter from the operational standpoint, either may be selected as warranted by operational circumstances without violating the spirit and scope of this invention, inasmuch as so doing would ostensively be well within the purview of the artisan having the benefit of the teachings herewith presented.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. An echo-ranging-search system comprising in combination:
    means, adapted for being moved along a predetermined navigation course, for broadcasting a predetermined energy along substantially that portion of said navigation course already traversed and within an arcular volume bounded thereby and at a given angle;
    means connected to the input of the aforesaid broadcasting means for the timely energization thereof in such manner as to cause it to broadcast said predetermined energy;
    first receiving transducer means spatially disposed substantially a predetermined distance from said energy broadcasting means, within said arcular volume, and in such position as to follow a course substantially paralleling the predetermined navigation course already traversed by said energy broadcasting means;
    a second receiving transducer means contiguously disposed with said first transducer means and also disposed in such manner as to be responsive to incoming signals, including target echoes, which arrive thereat from substantially within a planar volume, the plane of which passes through said second receiving transducer means and is perpendicular to said already traversed navigation course;
    readout means;
    means connected between the output of said second transducer means and an input of said readout means for supplying the aforesaid incoming signals thereto; and
    means connected between the output of said first transducer means and an input of said readout means for timely initiating the readout of the incoming signals received by said second transducer means.

2. A sonar system comprising in combination:
    a transmitting transducer adapted for being moved along a predetermined path;
    means connected to the input of said transmitting transducer for the timely energization thereof;
    an omni-directional receiving transducer spatially disposed substantially a predetermined distance from and in such position as to physically follow said transmitting transducer, as said transmitting transducer moves along said predetermined path;
    a sidewardly and downwardly looking receiving transducer contiguously disposed in fixed relationship with said omni-directionalo receiving transducer, and also disposed in such manner as to be responsive to data signals emanating substantially from within a plane that is perpendicular to the aforesaid predetemined path;
    readout means;
    means interconnecting the output of said omni-directional receiving transducer and an input of said readout means for timely initiating the readout of the data signals supplied thereto; and
    means interconnecting the output of the aforesaid sidewardly and downwardly looking transducer and an input to said readout means for supplying said data signals thereto.

3. The device of claim 2 wherein said readout means comprises:
    an oscilloscope readout having a horizontal sweep input, a vertical sweep input, and a data signal input, with the horizontal sweep input thereof connected to the output of said data signal readout initiating means, and with the data signal input thereof connected to the output of the aforesaid data signal supplying means; and
    a vertical raster generator, with the output thereof connected to the vertical sweep input of said oscillator readout.

4. The device of claim 2 wherein said readout means is a computer readout.

5. The device of claim 2 wherein said readout means is a recorder.

6. The device of claim 2 wherein said means interconnecting the output of the aforesaid sidewardly and downwardly looking transducer and an input to said readout means for supplying said data signals thereto comprises a receiver.

7. The device of claim 2 wherein said means interconnecting the output of said omni-directional receiving transducer and an input of said readout means for timely initiating the readout of the data signals supplied thereto comprises:
    an amplifier connected to the output of said omni-directional receiving transducer;
    a detector connected to the output of said amplifier;
    a differentiator connected to the output of said detector; and
    a variable time base generator having an input and an output with the input thereof effectively connected to the output of said differentiator and the output thereof connected to an input of said readout means.

8. The invention according to claim 7 further characterized by a variable delay line connected between the output of said differentiator and the input of said variable time base generator.

9. The invention according to claim 2 further characterized by a pulse generator connected to the input of said transmitting transducer energization means for the timely actuation thereof.

10. The invention according to claim 2 further characterized by alarm means connected to the output of said signal supplying means for sounding an alarm whenever the level of the aforesaid data signals does not exceed a predetermined value.

11. The device of claim 10 wherein said alarm means comprises:
    a thresholder having an input and an output, with the input thereof connected to the aforesaid data signal supply means;
    a relay connected to the output of said thresholder; and
    an alarm connected to the output of said relay.

* * * * *